250/203

United States Patent [19]

Cole

[11] 4,015,120
[45] Mar. 29, 1977

[54] OPTICAL SYSTEMS AND ASSOCIATED DETECTING MEANS

[75] Inventor: Henry B. Cole, East Woodstock, Conn.

[73] Assignee: American Optical Corporation, Southbridge, Mass.

[22] Filed: Feb. 21, 1961

[21] Appl. No.: 90,887

[52] U.S. Cl. .................. 250/216; 250/203 R; 250/239; 250/338; 350/301; 350/303; 102/70.2 P
[51] Int. Cl.² .................................. H01J 3/14
[58] Field of Search ............ 102/70.2 PF; 250/209, 250/216, 338, 203 R, 239; 350/301, 303

[56] References Cited
UNITED STATES PATENTS

| | | | |
|---|---|---|---|
| 2,137,598 | 11/1938 | Vos | 102/70.2 |
| 2,664,026 | 12/1953 | Kavanagh | 88/57 SD |
| 2,749,801 | 6/1956 | Clotar | 88/57 SD |
| 2,949,055 | 8/1960 | Blackstone | 178/6.5 |

Primary Examiner—T.H. Tubbessing
Assistant Examiner—S. C. Buczinski
Attorney, Agent, or Firm—H. R. Berkenstock, Jr.; William C. Nealon

EXEMPLARY CLAIM

1. An opaque hollow main supporting housing and a combined light-collecting and detecting system disposed within and surrounded by said main housing at a location intermediate its spaced opposite ends, said combined system being arranged to simultaneously view through a plurality of relatively small peripherally spaced light apertures in side wall portions of said main housing all azimuths of a predetermined endless annular object field outwardly of said housing and in concentric relation to a longitudinal axis extending centrally through said housing and to detect any appreciable change in light intensity occurring at any location in said annular object field, said combined system comprising a single relatively small photosensitive detecting element disposed at a fixed axial location in said main housing, a plurality of similar relatively small light apertures circumferentially arranged in side wall portions of said housing and appreciably spaced from each other in such a predetermined manner as to have each aperture face outwardly toward a different sector of said endless annular object field and jointly simultaneously admitting into said housing light from all parts of said annular object field, an optical system aligned with each aperture and with said single photosensitive detecting element, and each optical system comprising first and second specularly reflecting surfaces, said first surface being a plane surface positioned within said housing in a plane substantially parallel to said longitudinal axis and at a location substantially midway between the aperture associated therewith and said longitudinal axis, and said second surface being a spherically curved concave surface having its center of curvature disposed substantially upon said longitudinal axis, said first surface being so disposed in said housing and relative to the light aperture associated therewith as to intercept substantially all of the light rays from said object field which enter said housing therethrough and to reflect same toward said second surface, and said second surface being so disposed in said system as to receive said reflected light rays and direct same generally toward said detecting element, the spherical curvature of said second surface being such as to focus the light rays being reflected thereby at a focal plane in said housing intermediate said second surface and said detecting element, and a positive lens element centrally disposed within said housing and in optical contact with said detecting element so as to collect the light rays passing beyond said focal plane and direct same onto said relatively small detecting element.

7 Claims, 4 Drawing Figures

INVENTOR
HENRY B. COLE
ATTORNEYS

INVENTOR
HENRY B. COLE

OPTICAL SYSTEMS AND ASSOCIATED DETECTING MEANS

This invention relates to a combined optical viewing and detecting system positioned within a main opaque supporting housing and arranged to simultaneously view through a plurality of small peripherally spaced light apertures in side wall portions thereof all parts of an endless annular hollow conically shaped object field outwardly of said housing and to simultaneously detect changes in radiation occurring in any part thereof. More particularly, the invention relates to improvements in such a combined system which will not only increase efficiency, performance and discrimination thereof but which will also render it of more compact construction and easier to manufacture and assemble, will enable it to accept light to be detected at a more favorable elevation angle relative to an axis extending longitudinally and centrally through said housing and enable it to direct this light at an improved angle of incidence onto the detecting means of said system.

In co-pending application Ser. No. 685,062 filed Aug. 20, 1957, in the name of George R. Simpson et al, there is disclosed such a combined optical viewing and detecting system for viewing an endless annular object field and this system comprises within the housing a cylindrically curved mirror and a plurality of plane mirrors so positioned and angularly disposed relative to each other and relative to the light apertures in the housing that they will simultaneously monitor all parts of the external annular field and detect changes in radiation occurring in any part thereof.

It has now been found that this earlier combined system may be advantageously modified in such a way as to realize not only all of the advantages of the earlier construction, but also the improvements mentioned above. The improvements are realized in part by the use of a spherically shaped mirror (or in more exacting cases an aspheric mirror) in place of the cylindrical mirror of the earlier system, and in part by a special field stop, with the result that a compact and efficient "folded" optical arrangement is possible. Also when such a field stop is used at a suitable location with reference to each optical branch of the combined system so as to be optically arranged in the system between each light aperture and the detector, stray or unwanted light will be prevented from reaching the detector and will effect an increase in optical efficiency, selectivity and performance of the system.

Such changes will also enable the combined system to be designed for use at a more favorable elevation or "look" angle, allow the light to be directed onto the detector in a more acceptable manner and allow the field stop for the several branches of the combined system to be used at a preferred location within the housing; with the result that changes of lesser magnitudes than have been detectable heretofore in the light energy coming from the object field will be sensed. (The word "light" as used herein and elsewhere in the specification which follows is intended to include not only visible light but also infra-red and ultra-violet radiations as well.)

It is accordingly an object of the present invention to provide in side wall portions of a main opaque supporting housing, or the like, a plurality of small peripherally spaced light apertures so arranged as to simultaneously view, or examine, all parts of a predetermined endless annular object field in surrounding relation to said housing, or in surrounding relation to an axis therethrough, a single radiant energy detecting element centrally located within the housing, a curved mirror, which may be spherical or aspherical, and a plurality of plane mirrors so related to each other, to the light apertures and to the curved mirror as to "fold" the light within the housing upon itself in such a way as to conserve space within the housing as well as afford an increase in the optical performance of the combined system.

It is also an object of the invention to increase the optical efficiency and selectivity of the combined system by the use of a field stop at a predetermined location in each optical branch or path of the combined system between each light aperture and said detecting means.

It is a further object of the invention to provide in such a combined viewing and detecting system a spherically or aspherically curved mirror, a field stop and a plurality of angularly related plane mirrors so disposed within the housing and relative to the light apertures therein that, when each optical branch of the system is considered in the longitudinal direction thereof, it will focus the light from infinity substantially at the plane of the field stop associated therewith while also allowing this light to pass beyond the field stop and impinge upon a refracting element and the detecting element carried thereby, and also when each branch of the system is considered in the transverse direction thereof each branch will form a real image of the associated light aperture substantially at unit magnification at the axial location of the detecting element.

Other objects and advantages of the invention will become apparent from the detailed description which follows when taken in conjunction with the accompanying drawing, in which.

Figure 1:
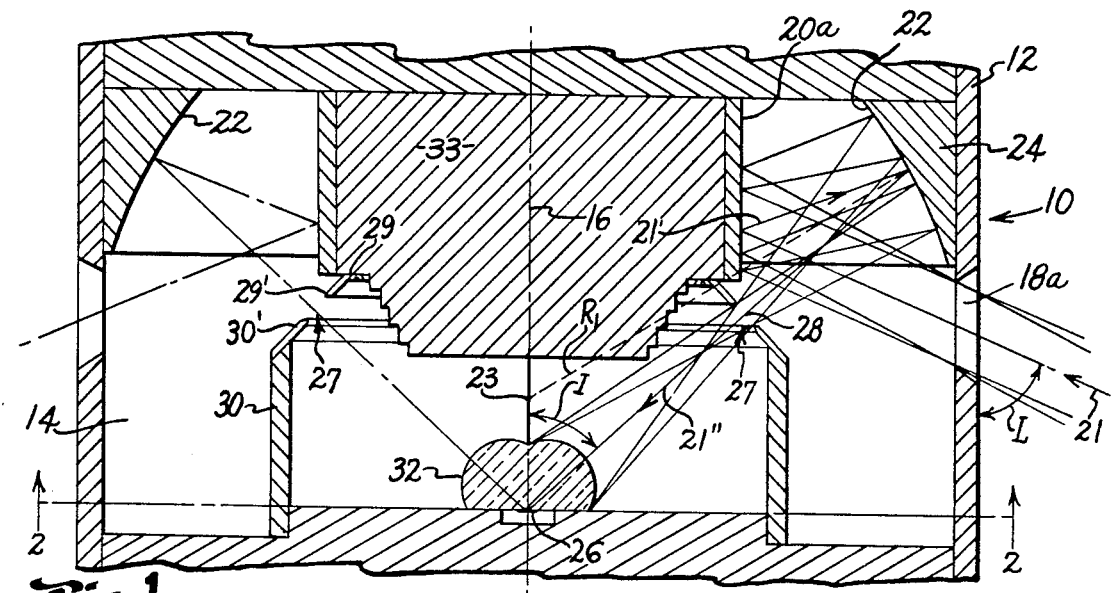
FIG. 1 is a central longitudinal sectional view through a part of a main supporting housing embodying the combined system of the present invention.
Figure 2:
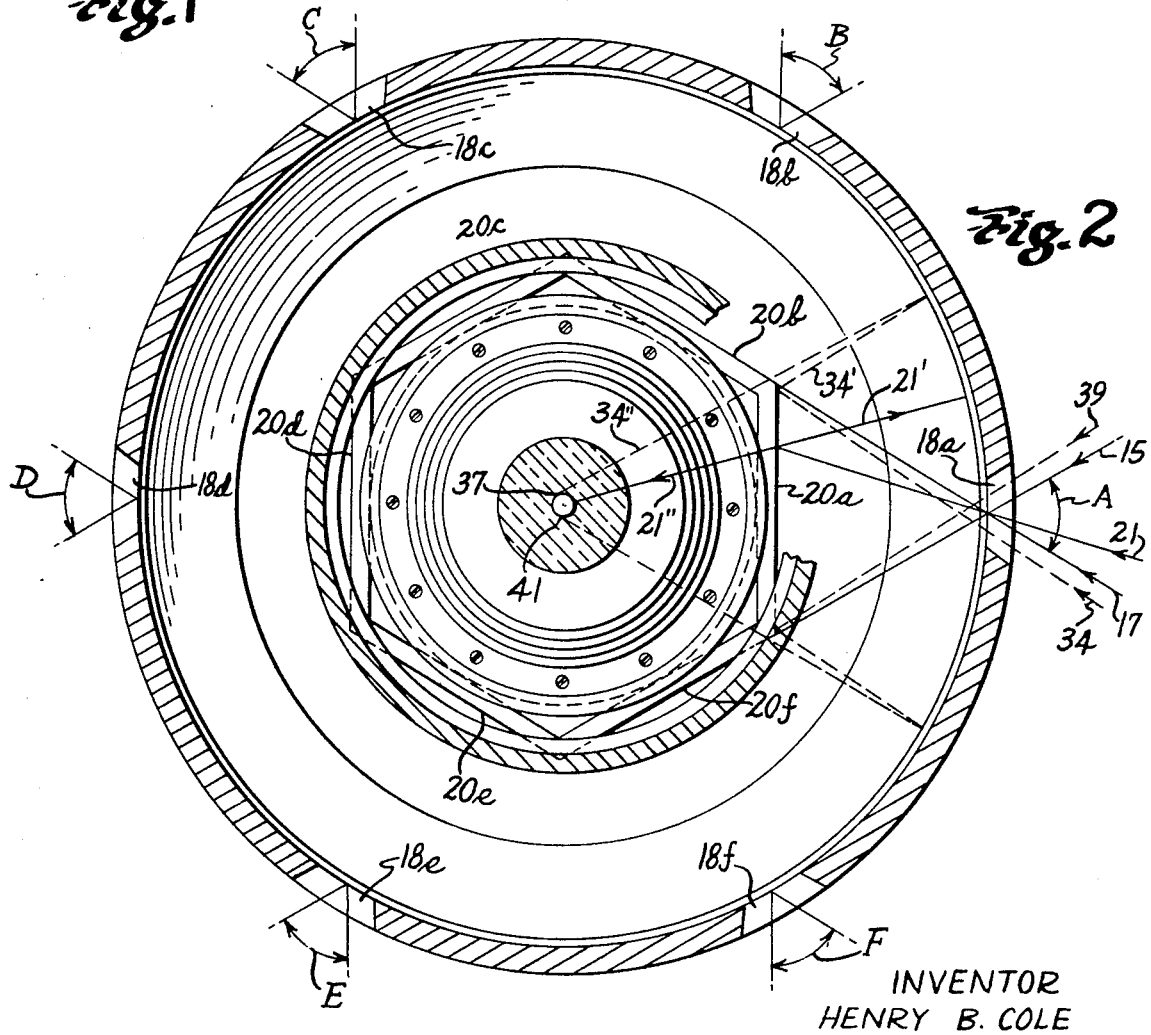
FIG. 2 is a cross-sectional view through said main housing, same being taken substantially upon section line 2—2 of FIG. 1 and looking in the direction of the arrows.

Referring to the drawing in detail, it will be seen that a portion of an elongated cylindrically shaped opaque main supporting housing of a missile, or the like, is indicated generally by the numeral 10 in FIGS. 1 and 2, and within the side wall portions 12 of this housing and intermediate its opposite ends is a chamber 14. In order to admit light from all parts of an endless annular object field surrounding this housing, or surrounding an axis 16 extending centrally and longitudinally therethrough, the side wall portions 12 are provided with a plurality of similar small light apertures, 18a, 18b, 18c, 18d, 18e and 18f. These apertures are equally peripherally spaced from each other and are arranged to lie substantially in the same transverse plane.

While only six light apertures have been shown in the instant disclosure and are arranged to collectively completely monitor all parts of a preselected endless annular object field by each being designed to cover or view a different 60° sector thereof, as indicated by angles A, B, C, D, E, and F, it should also be appreciated that the invention may as readily be accomplished by use of a different number of equally peripherally spaced apertures in the housing. From a practical standpoint, however, it will be readily appreciated that a limited number of openings, between three and eight is preferred; since in such cases fewer optical components will be required in the respective branches thereof, fewer transparent windows (not shown) would be required. should it be desired to hermatically seal the chamber 14, and fewer filter glasses (not shown) would be needed should it be desired to admit at each opening or window only radiation of a selected wavelength into the chamber.

Within the chamber 14 is a plurality of differently facing plane mirrors 20a, 20b, 20c, 20d, 20e and 20f, and each of these plane mirrors is disposed so as to face and be in optical alignment with a different light aperture. Also each of these plane mirrors is disposed so as to be spaced half way between the plane of its light aperture in wall portions 12 and the central longitudinal axis 16. Therefore, mirror 20a will be located half way between the plane of light aperture 18a and the axis 16 and will be preferably disposed in parallel relation to this axis.

Thus any principal light ray from any part of the 60 degree indicated by the horizontal or azimuth angle A included between outermost principal rays 15 and 17 and entering the housing 10 through the center of the aperture 18a, will impinge upon the plane mirror 20a aligned therewith, since this plane mirror is of such a size as to care for the full 60° sector in its operative position midway between the aperture wall and axis 16.

Such a principal ray, taken at random, is indicated at 21 in FIG. 2, and this ray after entering aperture 18a and impinging, as shown, upon mirror 20a will be reflected outwardly therefrom so as to travel in a radial plane which contains the axis 16, as indicated by the portion of this ray designated 21'. This is because mirror 20a is located exactly half way between the plane of the aperture and axis 16. This ray will then strike the concave spherically curved mirror-like surface 22 formed on a ring-like member 24, fitting within housing 12, and since the center of curvature of the spherical surface is at axial point 23 (see FIG. 1), this ray will then be reflected by this spherical surface inwardly, as shown by portion 21'' and will still be travelling in the same radial plane and toward central axis 16.

In fact, the geometry of the combined system shown in the drawing, considered in the transverse direction of the housing, is such that each plane mirror forms a virtual image of the light aperture associated therewith on the central axis 16, and the spherical surface 22 forms six real images of these light apertures 18a – 18f at six image planes near center 23, since the axis of symmetry of the spherical mirror is coincident with axis 16, but because of the angular relationship which exists between each plane reflecting surface and the spherical surface 22, these real images of apertures 18a – 18f will be formed to one side of point 23, as indicated by dotted radial line R, and the light rays from the aperture 18a.

If principal ray 21 is again considered with reference to FIG. 1, it will be apparent that this ray enters the housing through the center of aperture 18a and at an elevation angle L and thus will strike the plane mirror surface 20a at such an angle as to be reflected outwardly thereby toward the spherically curved surface 22, as indicated by that part of the ray designated 21'.

The spherical surface 22, however, is in such relation to this plane and aperture 18a that this ray portion 21' will impinge thereon at such a controlled angle that it will be thereafter reflected inwardly thereby toward the axis 16 and toward a point thereon at which a light detecting element 26 is located. This is because the spherical surface 22 forms an image of the light aperture 18a substantially at the surface of a refracting element 32 to be used with the detecting element. Thus a folded arrangement in each optical branch of the combined system will result.

On the other hand, if other rays (not shown) but parallel to ray 21 are considered so as to constitute a bundle of rays from a distant object point and should enter through aperture 18a, it will be clear that these rays will be reflected by the plane mirror surface 20a as parallel rays toward surface 22. However, since surface 22 is a spherical surface, these rays will be reflected and converged by surface 22 and will be brought to a focus at point 28 located approximately half way between surface 22 and center 23, but, of course, this focal point will be slightly longitudinally spaced to one side of radial line R from point 23 to the central point of incidence of this bundle of rays at surface 22.

Nevertheless, since such parallel rays from any external object point and entering aperture 18a, considered in longitudinal section, tend to similarly focus near such a location, it has been found advantageous to form a field stop 27 at this location. Furthermore, since the other optical branches aligned with the other light apertures 18b – 18f respectively, will perform in like manner, this field stop can be made circular in shape. Thus, it can be formed in part by the lower circular edge of a downwardly and outwardly extending circular flange 29'' formed on a circular collar 29 and in part by the upper circular edge 30' formed on an upstanding circular collar 30. The circular collar 29 is, in turn, secured to a central 33 support for carrying the plane mirrors. Since the general direction of these light rays travelling from the curved surface 22 toward the detecting element 26 is downwardly and inwardly in conical fashion and at a predetermined angle I relative to the axis 16, this circular field stop 27 is preferably arranged to face toward this conically shaped path for the light rays.

The light travelling downwardly and inwardly beyond the field stop 27, however, will be divergent light, when considered in longitudinal section, and for this reason, it will be desirous to arrange the refracting optical component 32 so as to bring these light rays to a focus upon the photosensitive detecting element 26.

The material of which component 32 is formed, of course, should be highly transparent to the particular radiation to be transmitted thereby. For example, if infra-red radiation is to be detected, an arsenic trisulphide glass would probably be used or if radiation in the visible is to be detected, an optical flint or crown glass might be employed.

Since the detecting element 26 is in the form of a disc-like coating in concentric relation to the central axis 16, it follows that angle I is also the angle of incidence of the light from each light aperture impinging thereon. Also since the positional relation between the different optical components in each optical branch of the combined system can be varied within limits to change the folded condition thereof, the angles L, and I can be changed somewhat when needed, keeping in mind, of course, that smaller angles of incidence at the detector will give a better cosine condition for the light being detected and that under different conditions of use, different elevation angles might be advantageously used.

Also since radiation from all parts of the spherical surface 22 travels generally downwardly and inwardly toward the detecting element 26, the refracting componenet 32 can be made symmetrical in all radial sections therethrough. Thus, this refractory element will be generally annular in shape when viewed from above, and thus will not only converge and focus the light rays upon the detector 26 when considered in longitudinal section (as in FIG. 1) but will also slightly converge the light rays transmitted therby when considered in transverse section (as in FIG. 2).

In FIG. 2, a detecting element 26 of limited transverse dimensions is employed and light apertures of small transverse opening are used. It will be clear, however, from a consideration of these parts that since each has finite size, light rays slightly outwardly of the 60° sectors A, B, C, D, E, and F, and entering the light apertures at slightly greater angularity will pass through the system so as to be "seen" by edge portions of the detector. For example, if the principal ray 17 is considered to be the outermost principal ray at one side of the 60° sector A which can be reflected by the plane mirror 20a and still reach the center of the detector, it will be possible for other light rays, such as light ray 34 travelling at a slightly greater angle to impinge upon the plane mirror 20a and be reflected toward the spherical surface 22 as indicated by dotted lines 34'. This ray, of course, will be at a very slight angle of incidence relative to the surface 22 and will be reflected thereby at such an angle as to travel along the dotted line path 34" and impinge upon the outer edge of the detector 26 as indicated at 37. Thus, this ray will be seen by the detector.

In like manner, if an equivalent light ray, such as ray 39 beyond the opposite edge of the sector A and at a slightly greater angle is considered, it will be apparent that this ray also will be reflected so as to be seen by the outer edge of the detector 26 at point 41. The overlapping of adjacent sector which thus will occur when all sectors are considered assured that all points in an endless annular object field outwardly of the housing will be seen.

Even though what might be termed a small triangularly shaped "blind space" between each pair of adjacent apertures exists outwardly of the housing and in juxtaposition thereto, since overlapping of adjacent sectors occurs only at locations which are spaced outwardly of the housing more than a predetermined small distance from the housing, nevertheless, these blind areas are not of material construction in the normal functioning of the system since same, from a practical standpoint, are not actually blind. A reason for this is that these triangular "blind" areas would ordinarily only extend out from the housing a very short distance and, of course, would be of much narrower width than the width of any light source to be detected thereby, such as an aircraft jet exhaust, an explosion or a gun flash. For example, if the distance between each pair of adjacent apertures in a housing were in the neighborhood of 4 inches, it is most likely that the triangular blind spaces would not extend outwardly from the housing 10 a distance of more than three or four feet before overlapping occurred.

Since all of the light rays entering the housing 10 from any part of the endless annular object field will experience two reflections, one at one of the plane mirrors and the other at the spherical mirror and are folded back upon themselves a more compact folded optical arrangement is afforded. It is possible in such a combined system to so differently relate these mirrors relative to each other and relative to the light apertures and the detector that a variety of elevation angles within an appreciable range can be provided, and also so that the light being directed onto the detector may have a favorable angle of incidence. A smaller and thus more favorable angle of incidence, of course, would reduce the cosine effect of the light upon the detector and thus render the detector more sensitive to small variations in the light being transmitted through the system.

Figure 3:
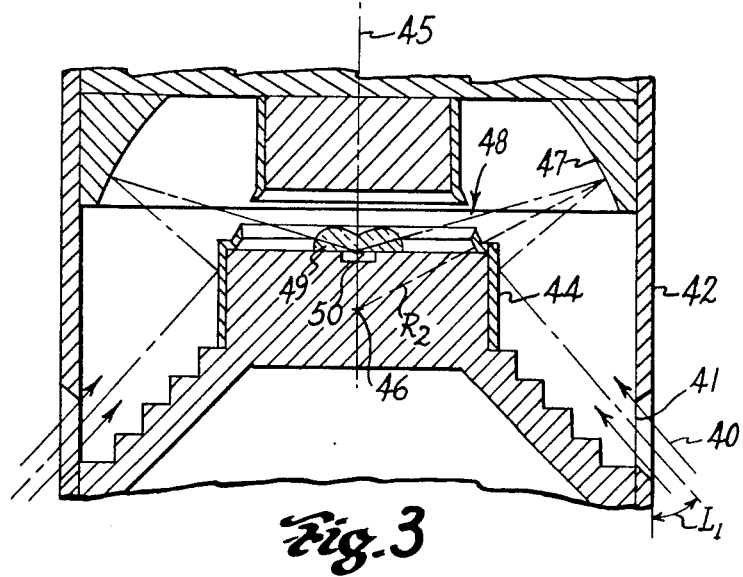
FIG. 3 is a longitudinal sectional view of a modified form of the invention.

In FIG. 3 is shown a modified six aperture construction wherein the positional relation of each plane mirror relative to the spherical mirror, relative to the light aperture and relative to the detector, is such that even though a folded system is obtained, nevertheless, it is not necessary to have the convergent light rays reflected by the spherical mirror cut across the paths of the light rays which have just entered the housing; as is the case in the modification of FIG. 1. In FIG. 3 the light rays 40 enter the light aperture 41 of the housing 42 at a steeper elevation angle or angle of look L than the rays entering housing 10 in FIG. 1, and, of course, these rays are reflected, as before, outwardly and and upwardly from the plane mirror 44 at a corresponding angle of reflection. Mirror 44 is disposed midway between the entrance aperture 41 and the central longitudinal axis 45 of the housing.

It is possible in such an arrangement to so locate the geometric center 46 of the spherical mirror 47 and to provide this mirror with such a radius of curvature $R_2$ as to have this spherical mirror intercept the light rays reflected by plane mirror 44 and to direct same back as convergent rays focused at an image plane disposed intermediate the spherical mirror 47 and axis 45, and a field stop 48 is provided at this location. A modified refracting element 49 is arranged at the axis 45 and, of course, is of such a curvature, considered in longitudinal section, as to refract and focus the divergent rays travelling beyond the field stop 48 onto the photosensitive element 50. Thus, the rays travelling from mirror 47 to element 50 will not cut across the path of those travelling from aperture 40 to mirror 44.

Figure 4:
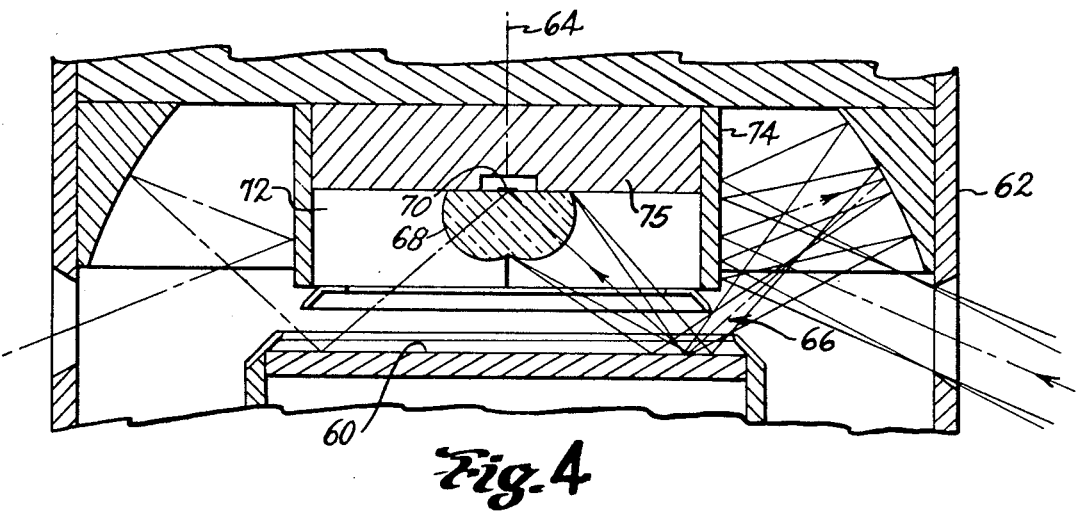
FIG. 4 is a longitudinal sectional view of a different modified form of the invention.

In FIG. 4, a slight modification of the six aperture structure of FIG. 1 has been shown, and the changes therein have been made in order to obtain a more compact construction insofar as the longitudinal dimension of the assembly is concerned. In this modification, an additional plane mirror 60 has been placed in the housing 62 so as to extend in a transverse relation to the central axis 64 of the housing, and this mirror 60 is located so as to intercept all of the divergent light rays shortly after they have passed through the associated circular field stop 66. The result is that all of these light rays from all apertures are folded back upon themselves and travel toward a refracting element 68 and are focused thereby on a detecting element 70. Both elements 68 and 70 are arranged within the hollow polyhedrally shaped chamber 72 formed by the six plane mirrors 74 of this combined system and are supported in operative position by a block 75. Thus, an even more compact arrangement is obtained.

At times, it may be desirable to form all of the plane mirrors of the combined system as a single polyhedral reflector, and this can be done without difficulty. It has the advantage that all of the plane mirror surfaces would be in proper fixed angular relation to each other and could not later be moved out of correct position.

While the surfaces 22 and 47 have been repeatedly referred to above as being of spherical curvature, it should be appreciated that an aspheric curvature instead can be used when desired with similar but slightly better optical performance. However, a good aspheric mirror is more expensive to make and the optical gain afforded thereby by more exact focus of the light rays might not at times justify the extra expense thereof.

Even though the plurality of plane mirrors in each case have been described as each being parallel to the central axis or axis of symmetry of the combined system, it is pointed out that a slight tilting of each mirror could be used when it is desired to alter the direction of the light rays to be reflected thereby, without appreciable detriment to the combined system. Also while ideally the field stop should be at right angles to the light rays passing therethrough, some angularity can be tolerated when other advantages in arrangement and so forth are to be gained thereby.

Having described my invention, I claim:

1. An opaque hollow main supporting housing and a combined light-collecting and detecting system disposed within and surrounded by said main housing at a location intermediate its spaced opposite ends, said combined system being arranged to simultaneously view through a plurality of relatively small peripherally spaced light apertures in side wall portions of said main housing all azimuths of a predetermined endless annular object field outwardly of said housing and in concentric relation to a longitudinal axis extending centrally through said housing and to detect any appreciable change in light intensity occurring at any location in said annular object field, said combined system comprising a single relatively small photosensitive detecting element disposed at a fixed axial location in said main housing, a plurality of similar relatively small light apertures circumferentially arranged in side wall portions of said housing and appreciably spaced from each other in such a predetermined manner as to have each aperture face outwardly toward a different sector of said endless annular object field and jointly simultaneously admitting into said housing light from all parts of said annular object field, an optical system aligned with each aperture and with said single photosensitive detecting element, and each optical system comprising first and second specularly reflecting surfaces, said first surface being a plane surface positioned within said housing in a plane substantially parallel to said longitudinal axis and at a location substantially midway between the aperture associated therewith and said longitudinal axis, and said second surface being a spherically curved concave surface having its center of curvature disposed substantially upon said longitudinal axis, said first surface being so disposed in said housing and relative to the light aperture associated therewith as to intercept substantially all of the light rays from said object field which enter said housing therethrough and to reflect same toward said second surface, and said second surface being so disposed in said system as to receive said reflected light rays and direct same generally toward said detecting element, the spherical curvature of said second surface being such as to focus the light rays being reflected thereby at a focal plane in said housing intermediate said second surface and said detecting element, and a positive lens element centrally disposed within said housing and in optical contact with said detecting element so as to collect the light rays passing beyond said focal plane and direct same onto said relatively small detecting element.

2. An opaque hollow main supporting housing and a combined light-collecting and detecting system disposed within and surrounded by said main housing at a location intermediate its spaced opposite ends, said combined system being arranged to simultaneously view through a plurality of relatively small peripherally spaced light apertures in side wall portions of said main housing all azimuths of a predetermined endless annular object field outwardly of said housing and in concentric relation to a longitudinal axis extending centrally through said housing and to detect any appreciable change in light intensity occurring at any location in said annular object field, said combined system comprising a single relatively small photosensitive detecting element disposed at a fixed axial location in said main housing, a plurality of similar relatively small light apertures circumferentially arranged in side wall portions of said housing and appreciably spaced from each other in such a predetermined manner as to have each aperture face outwardly toward a different sector of said endless annular object field and jointly simultaneously admitting into said housing light from all parts of said annular object field, an optical system aligned with each aperture and with said single photosensitive detecting element, and each optical system comprising first and second specularly reflecting surfaces, said first surface being a plane surface positioned within said housing in a plane substantially parallel to said longitudinal axis and at a location substantially midway between the aperture associated therewith and said longitudinal axis, and said second surface being a spherically curved concave surface having its center of curvature disposed substantially upon said longitudinal axis, said first surface being so disposed in said housing and relative to the light aperture associated therewith as to intercept substantially all of the light rays from said object field which enter said housing therethrough and to reflect same toward said second surface, and said second surface being so disposed in said system as to receive said reflected light rays and direct same generally toward said detecting element, the spherical curvature of said second surface being such as to focus the light rays being reflected thereby at a focal plane in said housing intermediate said first surface and said detecting element, a field stop disposed in said housing substantially at the focal plane of each of said optical systems and arranged to limit the longitudinal dimension of the object field being viewed by each optical system, and a positive lens element centrally disposed within said housing and in optical contact with said detecting element so as to collect the light rays passing beyond said focal plane and direct same onto said relatively small detecting element.

3. An opaque hollow main supporting housing and a combined light-collecting and detecting system disposed within and surrounded by said main housing at a location intermediate its spaced opposite ends, said combined system being arranged to simultaneously view through a plurality of relatively small peripherally spaced light apertures in side wall portions of said main housing all azimuths of a predetermined endless annular object field outwardly of said housing and in concentric relation to a longitudinal axis extending centrally through said housing and to detect any appreciable change in light intensity occurring at any location in said annular object field, said combined system comprising a single relatively small photosensitive detecting element disposed at a fixed axial location in said main housing, a plurality of similar relatively small light apertures circumferentially arranged in side wall portions of said housing and appreciably spaced from each other in such a predetermined manner as to have each aperture face outwardly toward a different sector of said endless annular object field and jointly simultaneously admit into said housing light from all parts of said annular object field, an optical system aligned with each aperture and with said single photosensitive detecting element, and each optical system comprising first and second specularly reflecting surfaces, said first surface being a plane surface positioned within said housing in a plane substantially parallel to said longitudinal axis and at a location substantially midway between the aperture associated therewith and said longitudinal axis, and said second surface being a spherically curved concave surface having its center of curvature disposed substantially upon said longitudinal axis, said first surface being so disposed in said housing and relative to the light aperture associated therewith as to intercept substantially all of the light rays from said object field which enter said housing therethrough and to reflect same toward said second surface, and said second surface being so disposed in said system as to receive said reflected light rays and direct same across the path of the light rays which have entered said housing through said associated light aperture and generally toward said detecting element, the spherical curvature of said second surface being such as to focus the light rays being reflected thereby at a focal plane in said housing intermediate, said second surface and said detecting element, and a positive lens element centrally disposed within said housing and in optical contact with said detecting element so as to collect the light rays passing beyond said focal plane and direct same onto said relatively small detecting element.

4. An opaque hollow main supporting housing and a combined light-collecting and detecting system disposed within and surrounded by said main housing at a location intermediate its spaced opposite ends, said combined system being arranged to simultaneously view through a plurality of relatively small peripherally spaced light apertures in side wall portions of said main housing all azimuths of a predetermined endless annular object field outwardly of said housing and in concentric relation to a longitudinal axis extending centrally through said housing and to detect any appreciable change in light intensity occurring at any location in said annular object field, said combined system comprising a single relatively small photosensitive detecting element disposed at a fixed axial location in said main housing, a plurality of similar relatively small light apertures circumferentially arranged in side wall portions of said housing and appreciably spaced from each other in such a predetermined manner as to have each aperture face outwardly toward a different sector of said endless annular object field and jointly simultaneously admitting into said housing light from all parts of said annular object field, an optical system aligned with each aperture and with said single photosensitive detecting element, and each optical system comprising first and second specularly reflecting surfaces, said first surface being a plane surface positioned within said housing in a plane substantially parallel to said longitudinal axis and at a location substantially midway between the aperture associated therewith and said longitudinal axis, and said second surface being a spherically curved concave surface having its center of curvature disposed substantially upon said longitudinal axis, said first surface being so disposed in said housing and relative to the light aperture associated therewith as to intercept substantially all of the light rays from said object field which enter said housing therethrough and to reflect same toward said second surface, and said second surface being so disposed in said system as to receive said reflected light rays and direct same across the path of the light rays which have entered said housing through said associated light aperture and generally toward said detecting element, the spherical curvature of said second surface being such as to focus the light rays being reflected thereby at a focal plane in said housing intermediate said second surface and said detecting element, a field stop disposed in said housing substantially at the focal plane of each of said optical systems and arranged to limit the longitudinal dimension of the object field being viewed by each optical system, and a positive lens element centrally disposed within said housing and in optical contact with said detecting element so as to collect the light rays passing beyond said focal plane and direct same onto said relatively small detecting element.

5. An opaque hollow main supporting housing and a combined light-collecting and detecting system disposed within and surrounded by said main housing at a location intermediate its spaced opposite ends, said combined system being arranged to simultaneously view through a plurality of relatively small peripherally spaced light apertures in side wall portions of said main housing all azimuths of a predetermined endless annular object field outwardly of said housing and in concentric relation to a longitudinal axis extending centrally through said housing and to detect any appreciable change in light intensity occurring at any location in said annular object field, said combined system comprising a single relatively small photosensitive detecting element disposed at a fixed axial location in said main housing, a plurality of similar relatively small light apertures circumferentially arranged in side wall portions of said housing and appreciably spaced from each other in such a predetermined manner as to have each aperture face outwardly toward a different sector of said endless annular object field and jointly simultaneously admitting into said housing light from all parts of said annular object field, an optical system aligned with each aperture and with said single photosensitive detecting element, and each optical system comprising first and second specularly relecting surfaces, said first surface being a plane surface positioned within said housing in a plane substantially parallel to said longitudinal axis and at a location substantially midway between the aperture associated therewith and said longitudinal axis, and said second surface being a spherically curved concave surface having its center of curvature disposed substantially upon said longitudinal axis, said first surface being so disposed in said housing and relative to the light aperture associated therewith as to intercept substantially all of the light rays from said object field which enter said housing therethrough and to reflect same toward said second surface, and said second surface being so disposed in said system as to receive said reflected light rays and direct same across the path of the light rays which have entered said housing through said associated light aperture and generally toward said detecting element, the spherical curvature of said second surface being such as to focus the light rays being reflected thereby at a focal plane in said housing intermediate said second surface and said detecting element, a field stop disposed in said housing substantially at the focal plane of each of said optical systems and arranged to limit the longitudinal dimension of the object field being viewed by each optical system, a plane mirror transversely disposed within said housing and located adjacent said field stop so as to intercept the light rays passing beyond each focal plane and reflect same generally toward said single detecting element, and a positive lens element centrally disposed within said housing and in optical contact with said detecting element so as to collect the light rays passing beyond said focal plane and direct same onto said relatively small detecting element.

6. An opaque hollow main supporting housing and a combined light-collecting and detecting system disposed within and surrounded by said main housing at a location intermediate its spaced opposite ends, said combined system being arranged to simultaneously view through a plurality of relatively small peripherally spaced light apertures in side wall portions of said main housing all azimuths of a predetermined endless annular object field outwardly of said housing and in concentric relation to a longitudinal axis extending centrally through said housing and to detect any appreciable change in light intensity occurring at any location in said annular object field, said combined system comprising a single relatively small photosensitive detecting element disposed at a fixed axial location in said main housing, a plurality of similar relatively small light apertures circumferentially arranged in side wall portions of said housing and appreciably spaced from each other in such a predetermined manner as to have each aperture face outwardly toward a different sector of said endless annular object field and jointly simultaneously admitting into said housing light from all parts of said annular object field, an optical system aligned with each aperture and with said single photosensitive detecting element, and each optical system comprising first and second specularly reflecting surfaces, said first surface being a plane surface positioned within said housing in a plane substantially parallel to said longitudinal axis and at a location substantially midway between the aperture associated therewith and said longitudinal axis, and said second surface being an aspherically curved concave surface having its center of curvature disposed substantially upon said longitudinal axis, said first surface being so disposed in said housing and relative to the light aperture associated therewith as to intercept substantially all of the light rays from said object field which enter said housing therethrough and to reflect same toward said second surface, and said second surface being so disposed in said system as to receive said reflected light rays and direct same generally toward said detecting element, the concave curvature of said second surface being such as to focus the light rays being reflected thereby at a focal plane in said housing intermediate said second surface and said detecting element, a field stop disposed in said housing substantially at the focal plane of each of said optical systems and arranged to limit the longitudinal dimension of the object field being viewed by each optical system, and a positive lens element centrally disposed within said housing and in optical contact with said detecting element so as to collect the light rays passing beyond said focal plane and direct same onto said relatively small detecting element.

7. An opaque hollow main supporting housing and a combined light-collecting and detecting system disposed within and surrounded by said main housing at a location intermediate its spaced opposite ends, said combined system being arranged to simultaneously view through a plurality of relatively small peripherally spaced light apertures in side wall portions of said main housing all azimuths of a predetermined endless annular object field outwardly of said housing and in concentric relation to a longitudinal axis extending centrally through said housing and to detect any appreciable change in light intensity occurring at any location in said annular object field, said combined system comprising a single relatively small photosensitive detecting element disposed at a fixed axial location in said main housing, a plurality of similar relatively small light apertures circumferentially arranged in side wall portions of said housing and appreciably spaced from each other in such a predetermined manner as to have each aperture face outwardly toward a different sector of said endless annular object field and jointly simultaneously admit into said housing light from all parts of said annular object field, an optical system aligned with each aperture and with said single photosensitive detecting element, and each optical system comprising first and second specularly reflecting surfaces, said first surface being a plane surface positioned within said housing in a plane substantially parallel to said longitudinal axis and at a location substantially midway between the aperture associated therewith and said longitudinal axis, and said second surface being an aspherically curved concave surface having its center of curvature disposed substantially upon said longitudinal axis, said first surface being so disposed in said housing and relative to the light aperture associated therewith as to intercept substantially all of the light rays from said object field which enter said housing therethrough and to reflect same toward said second surface, and said second surface being so disposed in said system as to receive said reflected light rays and direct same across the path of the light rays which have entered said housing through said associated light aperture and generally toward said detecting element, the concave curvature of said second surface being such as to focus the light rays being reflected thereby at a focal plane in said housing intermediate said second surface and said detecting element, a field stop disposed in said housing substantially at the focal plane of each of said optical systems and arranged to limit the longitudinal dimensions of the object field being viewed by each optical system, and a positive lens element centrally disposed within said housing and in optical contact with said detecting element so as to collect the light rays passing beyond said focal plane and direct same onto said relatively small detecting element.

* * * * *